United States Patent [19]

Doughty et al.

[11] Patent Number: 5,315,306

[45] Date of Patent: May 24, 1994

[54] SPRAY PAINT MONITORING AND CONTROL USING DOPPLER RADAR TECHNIQUES

[75] Inventors: John K. Doughty, Redondo Beach; Gerald Brand, Los Angeles, both of Calif.; Jack Y. Josefowicz, Philadelphia, Pa.

[73] Assignee: Hughes Aircraft Company, Los Angeles, Calif.

[21] Appl. No.: 100,511

[22] Filed: Jul. 30, 1993

[51] Int. Cl.$^5$ .......................... G01S 13/58; G01S 7/40
[52] U.S. Cl. ...................................... 342/192; 342/104
[58] Field of Search ........................ 342/104, 115, 192

[56] References Cited

U.S. PATENT DOCUMENTS 4,660,038  4/1987  Greneker, III ..................... 342/26
5,148,176  9/1992  Beattie et al. ..................... 342/104

OTHER PUBLICATIONS

Hamid et al., "Monitoring the Velocities of Particulates Using Doppler Radar", Journal of Microwave Power, Jul. 1975, pp. 163-170.

*Primary Examiner*—Gilberto Barrón, Jr.
*Attorney, Agent, or Firm*—Leonard A. Alkov; W. K. Denson-Low

[57] ABSTRACT

Systems and methods that use a CW Doppler radar to monitor paint particle velocities as they are sprayed from a paint gun to optimize the application of sprayed paint onto the object, and provide a closed loop spray painting system and paint spraying method that controls the application of paint in real time using data generated by the radar. The Doppler radar and a signal analyzer are used to analyze the Doppler return signals and display data indicative of the velocity of the paint particles. The data may be used by an operator to manually adjust the paint spray system. In addition, the spectrum analyzer may be used to generate and couple control signals to the paint spray system to provide for closed loop feedback control of thereof. One method comprises the following steps. Spraying paint particles toward an object that is to be painted using a paint spray gun. Radiating Doppler radar signals at the paint particles that are moving toward the object. Receiving backscattered Doppler shifted radar returns from the moving paint particles. Processing the received backscattered Doppler shifted radar returns to produce data indicative of the velocity of the paint particles. Displaying the data indicative of the velocity of the paint particles. This method unobtrusively and remotely measures paint particle velocity and velocity distribution. By additionally generating control signals in response to the data, the paint spray system is controlled.

22 Claims, 3 Drawing Sheets

SPRAY PAINT MONITORING AND CONTROL USING DOPPLER RADAR TECHNIQUES

BACKGROUND

The present invention relates generally to monitoring of spray painting systems and methods, and more particularly, to a spray paint monitoring system and method using Doppler radar.

Currently, automotive spray paint operations are required by emission laws and regulations to reduce the amount of volatile organic compounds that are emitted into the atmosphere. Conventional solvent borne spray paint processes presently used produce volatile organic compounds emissions of 4.0 lbs/gal, which just barely meets the federal and state (many but not all) pollution restrictions. It is anticipated that the restrictions will become much more stringent in the near future and that unless cleaner spray paint technology is developed expensive incineration facilities or other costly pollution controlling equipment will be required to control the pollution from paint operations.

A new spray painting process currently under development using super-critical carbon dioxide which is expected to lower the volatile organic compound emissions to 2.0 lbs/gal and which is expected meet the tighter requirements without requiring installation of pollution control equipment. However, to control the spraying process, a paint spray monitor is required. Specifically, in order to continually monitor and optimize the application of spray paint, it is necessary to provide for real time monitoring of the particle gun used in the spray painting system.

One conventional sensor that has been used in spray paint monitoring is a laser system that monitors the speed and size of individual paint particles. The laser approach uses two parallel helium-neon laser beams which were crossed as a result of being passed through a convex lens which had a focal length of 5 cm. An fringe pattern formed at the point where the laser beams intersected and the fringe spacing was approximately 5 $\mu$m. The waist of the beam at the focal point was approximately 70 $\mu$m, which was suitable for measuring particles in the 50–70 $\mu$m range. As a paint particle boundary crossed the interference fringe pattern it produced a temporal intensity fluctuation which was governed by the velocity of the particle in order to measure such small particles a short working distance was therefore required and consequently the laser source and the light scattering detector needed to be inside the spray paint profile.

The laser approach was successful in measuring spray paint particle velocities. However, due to the small beam width many measurements throughout the paint spray profile were needed in order to determine the distribution. To test the equipment, a series of experiments were run to determine the particle velocities at a distance of approximately 12 in from the spray gun nozzle 32 and at 5 different points through the spray paint particle distribution (center, and 2 and 3 inches above and below center, relative to the gun nozzle position). Particle velocities were measured as a function of changing the pre-orifice and orifice size in the paint gun nozzle 32 as well as changes in the $CO_2$ pressure applied to the gun. A trend to higher maximum mean particle velocity was observed when increasing the orifice size while maintaining the same pre-orifice size. The range of mean velocities was observed to change between 3 and 14 m/s over the course of all combinations of pre-orifice and orifice sizes used. It was also determined that for all combinations of pre-orifice and orifice sizes, a reduction in $CO_2$ pressure approximately 27% from 1500 psi to 1100 psi resulted in approximately 15% reduction in the maximum mean paint particle velocity. In these cases velocity did seem to be a good indicator of changing paint gun parameters.

The disadvantage of the laser scattering approach is that it requires a short working distance (approximately 5 cm) which makes the measurement intrusive to the spray paint profile. Since the laser beam sampling volume is very small (approximately 10–13 m$^3$) many measurements through the paint spray profile are necessary in order to determine the complete velocity distribution profile. This makes the measurements both time consuming and unsuitable for real time feedback monitoring. Consequently, the laser system is obtrusive (too close to the paint spray gun), too restricted in its monitoring area, and much too slow to accumulate gun data for real time process control.

Therefore, it would be desirable to have monitoring equipment and a closed loop control system and processing methods to improve spray paint quality control and provide cost savings resulting from increased transfer efficiency as a consequence of a higher charge transfer efficiency system on the paint gun. It would also be desirable to have monitoring equipment and a closed loop control system and processing methods that provide for a reduction in the emission of volatile organic compounds caused by spray paint operations.

Therefore, it is an objective of the present invention to provide for a spray paint monitoring system that may be employed with super-critical carbon dioxide spray painting systems. It is a further objective of the present invention to provide for a method that provides for real time monitoring of the performance of a particle gun used in a spray paint system by monitoring the paint spray produced thereby to optimize the application of spray paint. It is a further objective of the present invention to provide a system and method for closed loop control of a pressurized painting system.

SUMMARY OF THE INVENTION

In order to provide the above and other objectives, features, and advantages, the present invention is a system and method that uses a CW Doppler radar to monitor paint particle velocities as they are sprayed from a paint gun onto an object that is to be painted. Application of radar to monitor a spray painting process is unique to the real time paint spray process control art. In addition, the present invention provides for a closed loop spray painting system and paint spraying method that controls the application of paint in real time using data generated by the radar.

More particularly, one aspect of the present invention is a spray paint monitoring system for measuring paint particle velocities and indirectly monitoring a paint spray gun of a spray paint system to characterize it and provide data to adjust fan speed (particle spray speed) to control the pressure exerted on the paint, and thus optimize the application of sprayed paint onto an object that is to be painted. The spray paint monitoring system comprises a CW Doppler radar and a signal analyzer coupled to an output of the mixer, for analyzing the Doppler return signals and displaying data indicative of the velocity of the paint particles. The CW Doppler radar comprises a transmitter that includes a CW signal source coupled by way of a power divider to a power amplifier, a transmit antenna coupled to the power amplifier, a receiver comprising an RF preamplifier and a mixer, and wherein the mixer derives its local oscillator signal from the CW signal source of the transmitter, and a receive antenna coupled to the RF preamplifier.

The present invention also comprises a method that provides for real time monitoring of the particle gun used in a spray paint system to continually monitor and optimize the application of spray paint onto an object that is to be painted. The spray paint monitoring method comprise the following steps. Spraying paint particles toward an object that is to be painted using a paint spray gun. Radiating Doppler radar signals at the paint particles that are moving toward the object. Receiving backscattered Doppler shifted radar returns from the moving paint particles. Processing the received backscattered Doppler shifted radar returns to produce data indicative of the velocity of the paint particles. Displaying the data indicative of the velocity of the paint particles. The present method unobtrusively and remotely provides a means and method for measuring paint particle velocity and velocity distribution.

Another aspect of the present invention is a closed loop system that comprises a spray painting system including a pressurized (or other controllable parameter) spray gun adapted to spray paint at an object that is to be painted, the Doppler radar, and the signal analyzer. The signal analyzer analyzes the Doppler return signals and generates a control signal that is coupled to the spray gun to control the pressure at which paint is ejected therefrom. The spray painting method comprises spraying paint particles toward an object that is to be painted at a predetermined pressure, radiating Doppler radar signals at the paint particles that are moving toward the object, receiving backscattered Doppler shifted radar returns from the moving paint particles, processing the received backscattered Doppler shifted radar returns to produce data indicative of the velocity of the paint particles, displaying the data indicative of the velocity of the paint particles, and generating a control signal from the data and applying it to control the pressure at which the paint is sprayed and thereby optimize the application of sprayed paint onto the object.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
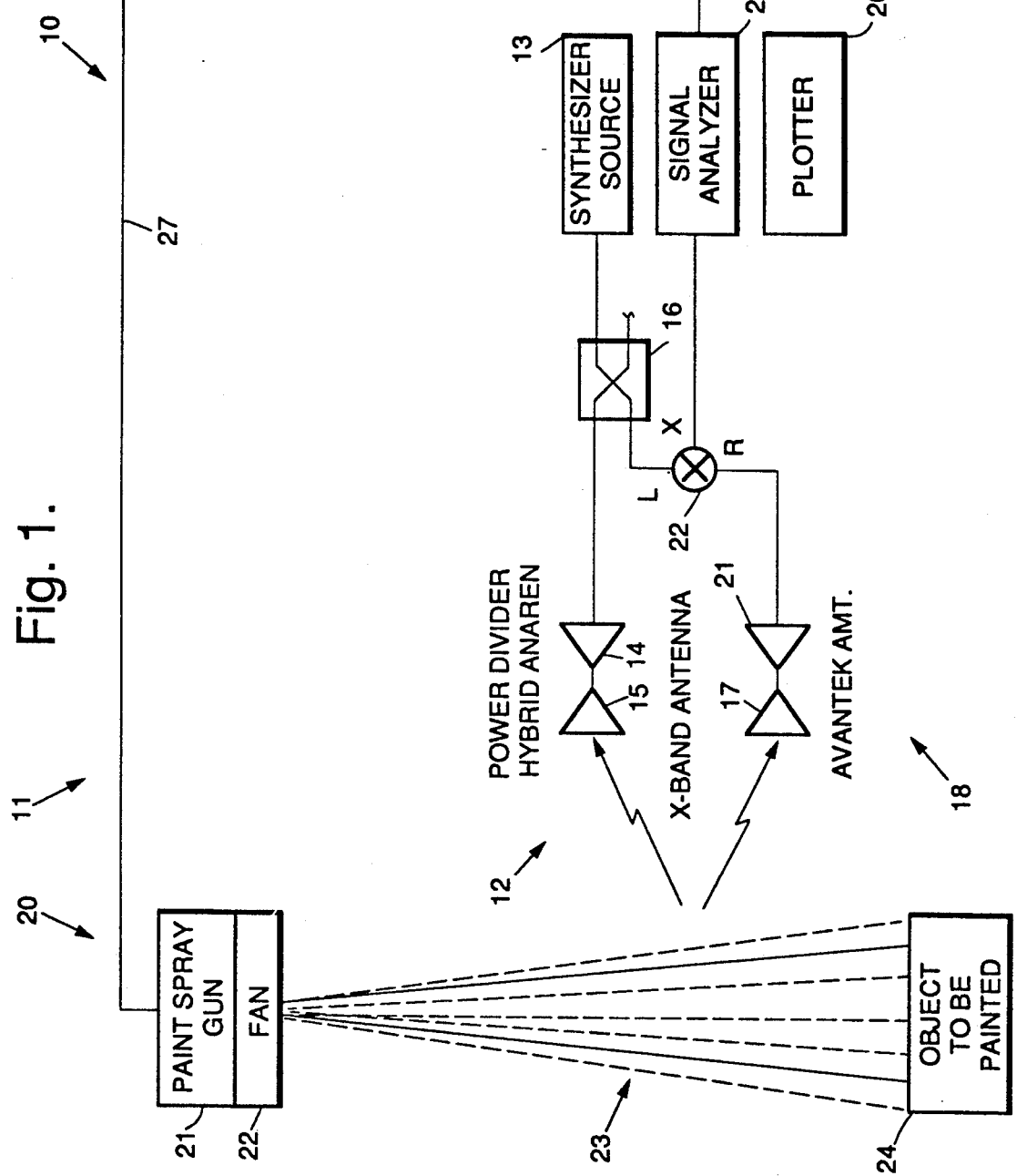
FIG. 1 is a diagram illustrating spray paint monitoring and control systems in accordance with the principles of the present invention.

Referring to the drawing figures, the application of CW Doppler radar to indirectly monitor a paint spray gun and characterize it by measuring paint particle velocities has been reduced to practice and is embodied in the manner illustrated in FIG. 1. More particularly, FIG. 1 is a diagram illustrating a spray paint monitoring system 10 incorporating a CW Doppler radar 11 in accordance with the principles of the present invention.

A paint spray system 30 with which the present spray paint monitoring system 10 is used is comprised of a paint spray gun 31 that has a nozzle 32 produces a paint spray fan 33 that includes paint particles 34 at are applied to an object 35 that is to be painted. The paint spray gun 31 may be a pressurized paint or compressed air carried paint spray system, for example. Thus the shape of the stream of paint particles forced under pressure out of the nozzle 32 of the paint spray gun 31 is in the shape of the paint spray fan 33. Specifically, the shape of the stream of paint particles is that of a right elliptical cone with vortex at the nozzle 32 of the paint spray gun 31 and with the base of the cone perpendicular to the direction of particle travel, and which is relatively narrow in one dimension and relatively broad in an orthogonal direction.

The Doppler radar 11 is a two aperture continuous wave (CW) radar operating at 9 GHz. It is comprised of a transmitter 12 that includes a CW signal source 13 feeding a GaAs FET power amplifier 14 by way of a power divider 16. The GaAs FET power amplifier 14 increases the output power to 2 Watts. This signal is radiated through an X-band transmit pyramidal horn 15 toward the paint spray fan 33 that is monitored.

The CW signal source 13 may be comprised of an HP 8340B 9 GHz signal source manufactured by Hewlett-Packard Company, for example. The GaAs FET power amplifier 14 may be comprised of a model 2701 amplifier manufactured by CMS, for example. The transmit horn 15 may be comprised of a type 849 horn manufactured by Diamond Antenna & Microwave Corp., for example. The power divider 16 may be a model 40268 hybrid power divider manufactured by Anaren, for example.

Signals backscattered from the paint particles 34 are received by an X-band receive pyramidal horn 17 also facing the paint spray fan 33, and sent to the homodyne receiver 18. The receiver 18 is comprised of an RF preamplifier 21 and a mixer 22. A local oscillator signal for the mixer 22 is derived from the CW signal source 13 of the transmitter 12 thus resulting downconversion of the radar returns to a near zero Hz intermediate frequency (IF).

The receive horn 17 may be comprised of a type 849 horn manufactured by Diamond Antenna & Microwave Corp., for example. The RF preamplifier 21 may be a model AMT 12035M manufactured by Avantek, for example. The mixer 22 may be a model DM1-18 balanced mixer manufactured by RHG, for example. The signal analyzer 25 may be a model HP 3561A signal analyzer manufactured by Hewlett-Packard Company, for example. The plotter 26 may be a conventional plotter manufactured by Hewlett-Packard Company, for example.

Because of the scattering particle velocities, the transmitted and scattered RF signal is Doppler shifted and the IF signal is in the audio range below 1000 Hz. This is monitored by a signal analyzer 25 that converts periodically sampled time domain samples using a fast Fourier transform (FFT) into a spectral display that is viewable by an operator, or that may be printed on a plotter 26, for example. An example display of the Doppler spectrum generated by the spray paint monitoring system 10 of the present invention and displayed by the signal analyzer 25 which resulting from monitoring paint sprayed from a commercial aerosol can shown in FIG. 2. More specifically, FIG. 2 represents a copy of the display derived from the signal analyzer 25 transferred to the plotter 26.

Figure 2:
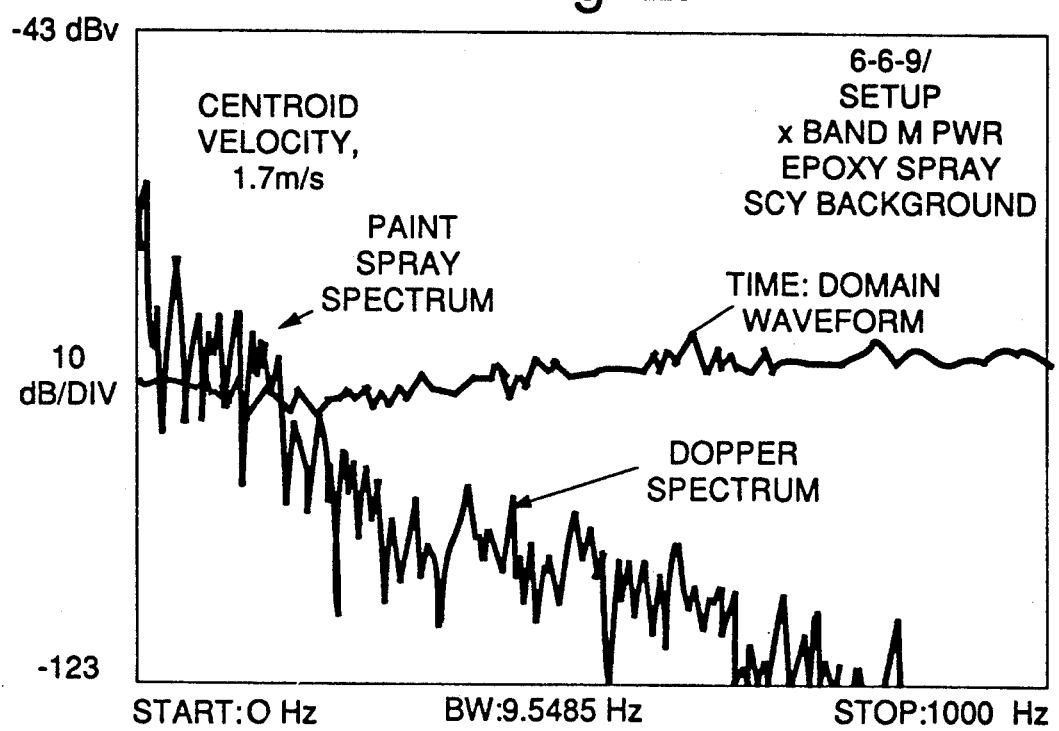
FIG. 2 illustrates data generated by the systems of FIG. 1.
Figure 3:
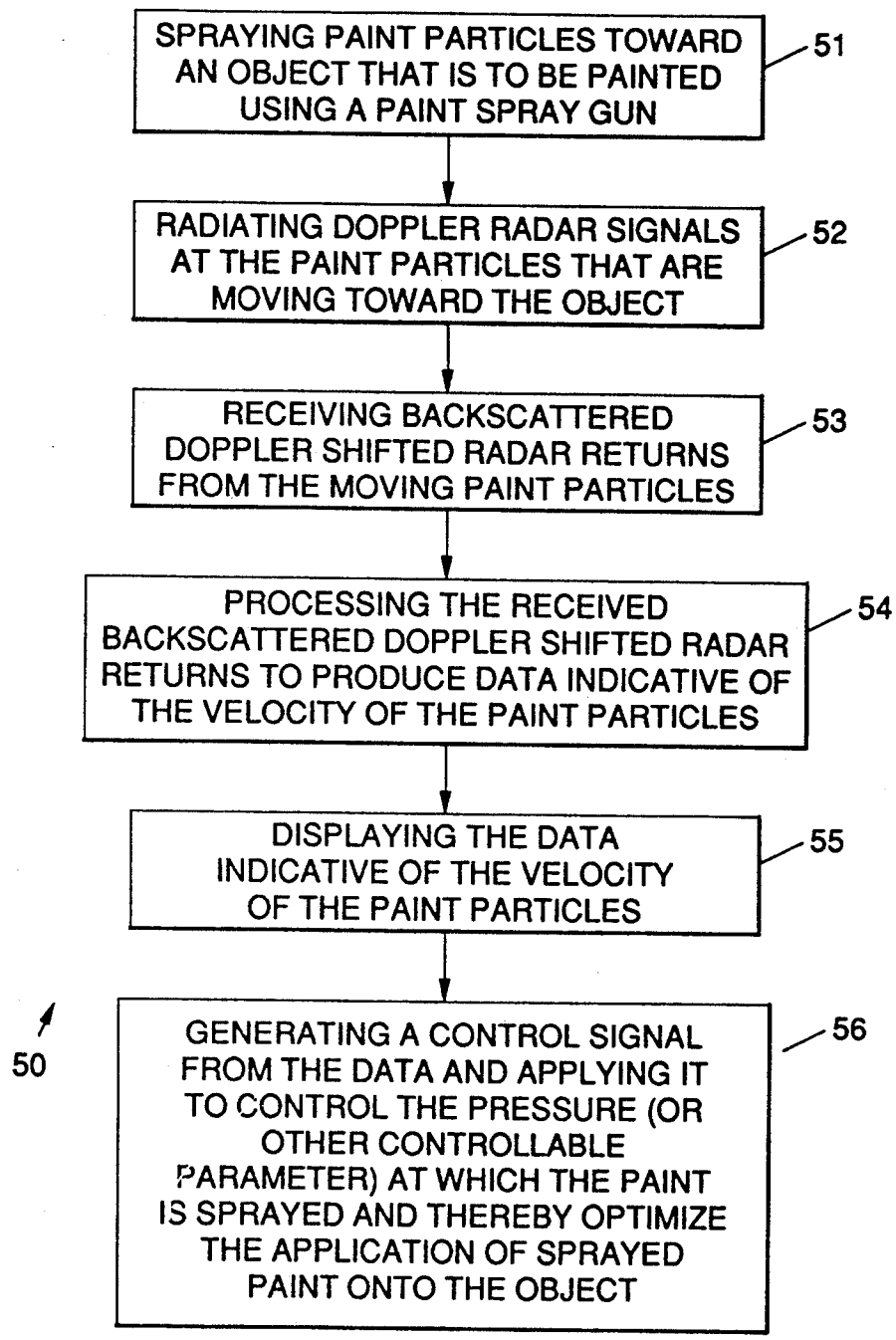
FIG. 3 is a flow diagram illustrating a method for optimizing the application of sprayed paint onto an object in accordance with the principles of the present invention, and a method that provides for closed loop control of a pressurized painting system in accordance with the principles of the present invention.

Two plots are shown in FIG. 2, the first is a time domain waveform and is a time segment of the IF signal derived from the mixer 22 in the receiver 18. The vertical plot axis for this trace is voltage and the horizontal axis is time. The second trace is a Doppler spectrum and is a plot of the frequency content of the time domain waveform. Frequency components of the signal are plotted on the horizontal axis scaled linearly in Hertz from zero to 1000 (left to right, respectively). The vertical axis is the amplitude of the signal at each frequency scaled linearly in dBV, or in decibels relative to one volt, from −43 dBV to −123 dBV (top to bottom respectively). The paint spray spectrum is denoted, that is the frequency spectrum of signals caused by the backscattering of radar signals from the moving paint particles. The median frequency for this spectrum is identified in FIG. 2, and it represents a center of particle velocities of approximately 1.7 meters per second.

The signal analyzer 25 optionally generates a control signal that is coupled to the paint spray gun 21 by way of control lines 27 to control the pressure at which paint is sprayed by the gun 21, or other controllable parameter. This provides for closed loop, real time, feedback control of the spray painting system 20 in response to data generated by the radar 11. This is achieved in a straightforward manner.

Although the concepts of the present invention seem relatively simple and straightforward in retrospect, a great deal of effort was expended to determine the characteristics of the CW Doppler radar 11 of the present invention.

A 60 GHz radar was first evaluated. Initial tests were conducted using millimeter wave (mmW) hardware comprising a homodyne, CW Doppler radar. This hardware included a free-running unmodulated GUNN oscillator at 60 GHz that supplied both the transmitted power (+14 dBm) and the local oscillator input to a fundamental mixer. A broadband IF output was DC coupled providing capability of monitoring Doppler shifted returns scattered from objects with absolute velocities relative to the transceiver of near zero to well over $10^4$ m/s. Since the anticipated paint velocity was 3 to 10 m/s, an AC coupled HP3561 signal analyzer was used limiting the velocity range at 2.5 mm/s, to 250 m/s. A standard gain (+24 dB) horn was a single aperture antenna for the radar.

The first observations of chlorodiflouromethane (electronic component freeze spray) and (probably) condensed water vapor were encouraging. This mist was convenient since it did not leave a residue and could be sprayed close to and directly into the horn aperture. Additional tests using paint sprayed in a paint hood from commercially available aerosol cans and using the original compound sprayed away from the antenna at a meter range were not successful. No signal returns above the background noise in the radar were noticeable. Modifications to use a single higher gain Cassegrain antenna (2 degree beamwidth) or a change to a two aperture horn antenna did not improve results. It was concluded that the radar lacked sufficient sensitivity to see small particle sizes at this range.

A 94 GHz radar was then evaluated. Since the wavelength of the millimeter wave signals is much longer than the scattering particle diameter, Rayleigh scattering principles dictate that the scattered power is proportional to the frequency to the fourth power. To take advantage of this, millimeter wave hardware at 94 GHz was used for additional tests. Its output power was also near 10 mW. In addition, an internal 26 dB gain IF amplifier improved radar sensitivity by 26 dB. A theoretical noise figure of 29 dB was possible. The noise floor is limited by the signal analyzer noise floor of −118 dBm, which is a very poor noise figure of 46 dB.

However, once again this radar proved to have insufficient sensitivity to detect aerosol can paint sprayed into a paint booth. The noise floor was not at the analyzer's minimum level of 131 dBV, but was around −115 dBV. As with the 60 GHz radar described above, major contributors to radar or background noise were: uncorrelated LO phase noise caused by delayed signal returns, mixer noise injected by the LO, motion within the room and spray hood, florescent light modulation of returns, equipment reflections Doppler shifted by cooling fans, EMI, and other sources. It was concluded at least 20 to 30 dB more sensitivity would be needed.

In an attempt to achieve this additional sensitivity, the present X-band CW Doppler radar 11 operating at 9 GHz was constructed as shown in FIG. 1. Considerable sensitivity was lost given Rayleigh's scattering criteria (41 dB), but the following advantages were achieved. The noise figure approached 5 dB of the RF preamplifier (a 24 dB improvement), the noise added from a relatively clean synthesized LO was reduced if not made insignificant (a 33 dB improvement), the transmit horn was moveable to provides for different scattering angles, and more output power was transmitted (2 W, or an increase of 23 dB). The net improvement in sensitivity was as high as 39 dB.

Tests were conducted to verify performance. The gain of the preamplifier was measured with a 10 dB pad on its output. This pad was then removed to increase sensitivity. Then with the radar interconnected as shown in FIG. 1, the analyzer and/or LO noise was monitored with preamplifier power removed. The noise was found to be below the analyzer maximum sensitivity of −131 dBV.

An observation of the noise level after preamplifier power was applied indicated that near maximum receiver sensitivity was obtained. Assuming the receiver characteristics of table I, this noise level seems only slightly higher than expected.

TABLE I

| Receiver Noise Power Calculation | |
|---|---|
| Thermal noise power (kTB) in 10 Hz | −164 dBm |
| Preamplifier NF | 4 dB |
| Preamplifier gain | 42 dB |
| Specified mixer conversion gain | −6 dB |
| Estimated correction for unloaded mixer | 6 dB |
| Conversion to dBV | −13 dB |
| Expected noise at analyzer | −131 dBV |

Then the remaining components were added to test the full radar 11 shown in FIG. 1. It was found that the greatest of all desensitizing causes were florescent return modulation, operator movement and reflections from equipment fans. None of these motions were in the mainbeam and most were in a position that reflections from walls and equipment would be required to enter the receive horn. Freeze spray plumes could not be seen above this noise. It was then concluded that any further testing must be done in free space.

The remainder of the spray mist tests were done outside with a sky background to minimize reflections and thus floor noise. With the large amount of transmit power, the noise was never near the −130 dBV minimum seen with only the receiver powered, but it was sufficiently below the returns from typical mists to provide reasonable measurement results. Successful spray observation results were obtained.

From these tests at X-band using the spray paint monitoring system 10 of the present invention, a paint spray plume was seen with significant signal to noise ratio to provide useful data from which an operator can adjust spray gun pressure parameters (or other controllable parameters), or for the system 10 to provide closed loop feedback control of the spray gun 22. Thus the present CW Doppler radar 11 is a viable tool for high speed spray characterization. The present spray paint monitoring system 10 provides a velocity distribution of a bulk plume using backscattered Doppler returns. Furthermore, the present system 10 provides for closed loop feedback control of pressurized spray painting systems, and the like.

For the purposes of completeness, FIG. 3 show a flow diagram illustrating two methods 50, 60 in accordance with the principles of the present invention. FIG. 3 is a flow diagram illustrating a method 50 for optimizing the application of sprayed paint onto an object in accordance with the principles of the present invention, and a method 60 that provides for closed loop control of a painting system in accordance with the principles of the present invention.

The method 50 comprises the steps of spraying paint particles toward an object that is to be painted using a paint spray gun, as indicated in step 51; radiating Doppler radar signals at the paint particles that are moving toward the object, as indicated in step 52; receiving backscattered Doppler shifted radar returns from the moving paint particles, as indicated in step 53; processing the received backscattered Doppler shifted radar returns to produce data indicative of the velocity of the paint particles, as indicated in step 54; and displaying the data indicative of the velocity of the paint particles, as indicated in step 55. The method 60 comprises the above steps 51–55 and further includes the step of generating a control signal from the data and applying it to control the pressure (or other controllable parameter) at which the paint is sprayed and thereby optimize the application of sprayed paint onto the object, as indicated in step 56.

Thus there has been described new and improved spray paint monitoring systems and methods using Doppler radar. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A spray paint monitoring system for optimizing the application of sprayed paint onto an object that is to be painted, said spray paint monitoring system comprising:

a Doppler radar comprising:
- a transmitter that includes a CW signal source coupled by way of a power divider to a power amplifier;
- a transmit antenna coupled to the power amplifier;
- a receiver comprising an RF preamplifier and a mixer, and wherein the mixer derives its local oscillator signal from the CW signal source of the transmitter; and
- a receive antenna coupled to the RF preamplifier; and a signal analyzer coupled to an output of the mixer, for analyzing the Doppler return signals and displaying data indicative of the velocity of the paint particles.

2. The spray paint monitoring system of claim 1 wherein the radar comprises a continuous wave (CW) Doppler radar operating at 9 GHz.

3. The spray paint monitoring system of claim 2 wherein the continuous wave (CW) Doppler radar generates radar signals at a frequency of 9 GHz.

4. The spray paint monitoring system of claim 1 wherein the transmit antenna comprises a transmit pyramidal horn.

5. The spray paint monitoring system of claim 1 wherein the receive antenna comprises a receive pyramidal horn.

6. The spray paint monitoring system of claim 1 wherein the receiver comprises a homodyne receiver.

7. The spray paint monitoring system of claim 1 wherein radar returns from the paint particles are downconverted to a near zero Hz intermediate frequency (IF).

8. A spray paint monitoring method for optimizing the application of sprayed paint onto an object that is to be painted, said spray monitoring method comprising the steps of:

- spraying paint particles toward an object that is to be painted using a paint spray gun;
- radiating Doppler radar signals at the paint particles that are moving toward the object;
- receiving backscattered Doppler shifted radar returns from the moving paint particles;
- processing the received backscattered Doppler shifted radar returns to produce data indicative of the velocity of the paint particles; and
- displaying the data indicative of the velocity of the paint particles.

9. The spray paint monitoring method of claim 8 wherein the step of radiating Doppler radar signals at the paint particles comprises radiating a continuous wave (CW) Doppler radar signals.

10. The spray paint monitoring method of claim 9 wherein the radar signals are generated at a frequency of 9 GHz.

11. The spray paint monitoring method of claim 8 wherein radar returns from the paint particles are downconverted to a near zero Hz intermediate frequency (IF).

12. A system for applying paint onto an object that is to be painted, said system comprising:

a spray painting system comprising a pressurized spray gun adapted to spray paint at an object that is to be painted;

a Doppler radar comprising:
- a transmitter that includes a CW signal source coupled by way of a power divider to a power amplifier;

a transmit antenna coupled to the power amplifier;

a receiver comprising an RF preamplifier and a mixer, and wherein the mixer derives its local oscillator signal from the CW signal source of the transmitter; and a receive antenna coupled to the RF preamplifier; and a signal analyzer coupled to an output of the mixer and coupled to the spray painting system, for analyzing the Doppler return signals and displaying data indicative of the velocity of the paint particles, and for generating a control signal that is coupled to the spray gun to control the pressure at which the paint is ejected therefrom.

13. The spray paint monitoring system of claim 12 wherein the radar comprises a continuous wave (CW) Doppler radar operating at 9 GHz.

14. The spray paint monitoring system of claim 15 wherein the continuous wave (CW) Doppler radar generates radar signals at a frequency of 9 GHz.

15. The spray paint monitoring system of claim 12 wherein the transmit antenna comprises a transmit pyramidal horn.

16. The spray paint monitoring system of claim 12 wherein the receive antenna comprises a receive pyramidal horn.

17. The spray paint monitoring system of claim 12 wherein the receiver comprises a homodyne receiver.

18. The spray paint monitoring system of claim 12 wherein radar returns from the paint particles are downconverted to a near zero Hz intermediate frequency (IF).

19. A method for applying paint onto an object that is to be painted, said method comprising the steps of:

spraying paint particles toward an object that is to be painted at a predetermined pressure;

radiating Doppler radar signals at the paint particles that are moving toward the object;

receiving backscattered Doppler shifted radar returns from the moving paint particles;

processing the received backscattered Doppler shifted radar returns to produce data indicative of the velocity of the paint particles;

displaying the data indicative of the velocity of the paint particles; and generating a control signal from the data and applying it to control the pressure at which the paint is sprayed and thereby optimize the application of sprayed paint onto the object.

20. The spray paint monitoring method of claim 19 wherein the step of radiating Doppler radar signals at the paint particles comprises radiating a continuous wave (CW) Doppler radar signals.

21. The spray paint monitoring method of claim 20 wherein the radar signals are generated at a frequency of 9 GHz.

22. The spray paint monitoring method of claim 19 wherein radar returns from the paint particles are downconverted to a near zero Hz intermediate frequency (IF).

* * * * *